US009928635B2

(12) United States Patent
Lucey et al.

(10) Patent No.: US 9,928,635 B2
(45) Date of Patent: Mar. 27, 2018

(54) SYSTEM AND METHOD OF GENERATING A NON-RIGID MODEL

(71) Applicant: COMMONWEALTH SCIENTIFIC AND INDUSTRIAL RESEARCH ORGANISATION, Campbell (AU)

(72) Inventors: Simon Michael Lucey, Campbell (AU); Jason Mora Saragih, Campbell (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 160 days.

(21) Appl. No.: 14/429,522

(22) PCT Filed: Sep. 19, 2013

(86) PCT No.: PCT/AU2013/001072
§ 371 (c)(1),
(2) Date: Mar. 19, 2015

(87) PCT Pub. No.: WO2014/043755
PCT Pub. Date: Mar. 27, 2014

(65) Prior Publication Data
US 2015/0235406 A1      Aug. 20, 2015

(30) Foreign Application Priority Data
Sep. 19, 2012   (AU) ................................ 2012904080

(51) Int. Cl.
*G06T 13/80*   (2011.01)
*G06T 7/20*    (2017.01)
(Continued)

(52) U.S. Cl.
CPC .............. *G06T 13/80* (2013.01); *G06F 17/10* (2013.01); *G06K 9/52* (2013.01); *G06T 7/20* (2013.01)

(58) Field of Classification Search
None
See application file for complete search history.

(56) References Cited

U.S. PATENT DOCUMENTS 8,144,976 B1 *   3/2012   Shiell ................. G06K 9/00281
                                                          345/420
2005/0169536 A1  8/2005   Accomazzi et al.
(Continued)

FOREIGN PATENT DOCUMENTS

WO     201/037222 A1     5/2001

OTHER PUBLICATIONS

International Search Report and Written Opinion dated Dec. 9, 2013 of International Patent Application No. PCT/AU2013/001072, 10 pages.
(Continued)

*Primary Examiner* — Yi Wang
(74) *Attorney, Agent, or Firm* — Kilpatrick Townsend & Stockton LLP (57) ABSTRACT

A computer-implemented method (400) to generate an avatar, such as an avatar forming part of synthetic user generated content. The method comprises determining a rigid model based on an appearance error, a shape error and a dimensionality (425) of received images (405), and an appearance component and shape component of the rigid model. The non-rigid digital model may be a person specific active appearance model. Other aspects of include a computer system (200) and software (225).

16 Claims, 5 Drawing Sheets

(51) Int. Cl.
*G06K 9/52* (2006.01)
*G06F 17/10* (2006.01)

(56) References Cited

U.S. PATENT DOCUMENTS

2006/0146199 A1* 7/2006 Kijak ................ G06F 17/30802
                                                                                 348/700
2010/0295854 A1    11/2010 Miller

OTHER PUBLICATIONS

Candes et al., "Robust Principal Component Analysis?", Journal of the ACM, vol. 58, No. 3, Article 11, 37 pages (2011).
Peng et al., "RASL: Robust Alignment by Sparse and Low-rank Decomposition for Linearly Correlated Images", IEEE Transactions on Pattern Analysis and Machine Intelligence (PAMI), Jul. 2010.

\* cited by examiner

SYSTEM AND METHOD OF GENERATING A NON-RIGID MODEL

CROSS-REFERENCE TO RELATED APPLICATIONS

The present application is a National Stage of International Application No. PCT/AU2013/001072, filed Sep. 19, 2013, and which claims priority from Australian Provisional Patent Application No 2012904080 filed on 19 Sep. 2012, the content of which is incorporated herein by reference.

TECHNICAL FIELD

The present invention relates to generation of a digital model. In particular, although not exclusively, the invention relates to generating a video using a person specific active appearance model.

BACKGROUND ART

User generated content (UGC) is becoming more and more popular as digital cameras are now commonplace on a multitude of devices. Users may record a video of themselves or someone else and share it with friends of family via a website or through email.

Synthetic UGC, where video clips are animated by a user, is also increasing in popularity. During elections it is popular to animate avatars representing politicians, and at holidays it is popular to animate characters relating to the holiday, such as elves in relation to Christmas.

Several systems exist that allow a user to animate an avatar through commands. Examples of such commands include commands to make the avatar laugh or smile, show an expression, or move in a particular way. However, a problem with such systems of the prior art is that the avatar can only act based upon a limited set of commands. This often results in a limited ability to express emotion, and accordingly the avatar does not have a life-like appearance.

Certain systems allow for a user to animate an avatar through the user's own movement. Some of these systems include expression detection, wherein a user's expression is detected and then applied to the avatar. Other more advanced systems include modelling of movement and expression of the user, and applying the resulting model to the avatar.

A further problem with these systems of the prior art is that the modelling process can be complex and time consuming. Attempts at reducing complexity can result in a system that is not sufficiently robust and/or wherein the model of the user is not accurate. Similarly, the complex prior art systems are not particularly suited to complexity sensitive applications such as real time and mobile applications.

Yet another problem with systems of the prior art is that the model generated by the systems may not be close to a true representation of the user. This is especially prevalent when a limited amount of training data is provided. In this case, overfitting may occur, wherein the model does not accurately describe the user, yet fits well to the training data.

SUMMARY OF THE INVENTION

According to a first aspect, the invention resides in a method of generating a non-rigid model including:
receiving, on a data interface, a plurality of key images; and
generating, by a processor, the non-rigid model based upon:
an appearance error between appearances in the plurality of key images and an appearance component of the non-rigid model;
a shape error between shapes in the plurality of key images and a shape component of the non-rigid model; and
a dimensionality of the shape and appearance components of the non-rigid model.

Preferably, generating the non-rigid model further comprises estimating a cost function including the appearance error, the shape error and the dimensionality of the non-rigid model.

Preferably, the cost function comprises:

$\|D\|_* + \lambda_a \|E_a\|_1 + \lambda_s \|E_s\|_1$, wherein $\|D\|_*$ comprises a nuclear norm of the appearance and shape components;
$\|E_a\|_1$ comprises an L1 norm of the appearance error;
$\|E_s\|_1$ comprises the L1 norm of the shape error; and
$\lambda_a, \lambda_s$ comprise weighting factors of the appearance error and shape error respectively.

Preferably, generating the non-rigid model comprises jointly minimising the appearance error, the shape error and the dimensionality of the non-rigid model.

Preferably, the dimensionality of the shape and appearance components of the non-rigid model comprises a rank of a matrix describing the shape and appearance components.

Preferably, the dimensionality of the shape and appearance components of the non-rigid model comprises determining a nuclear norm of the matrix describing the shape and appearance components.

Preferably, the shape error comprises an L1 norm of a matrix representing an error between shapes in the plurality of key images and a shape component of the non-rigid model.

Preferably, the appearance error comprises an L1 norm of a matrix representing an error between appearances in the plurality of key images and the appearance component of the non-rigid model.

Preferably, generating the non-rigid model further comprises anchoring the non-rigid model to a subspace of a generic model.

Preferably, the non-rigid model comprises an Active Appearance Model (AAM). More preferably, the non-rigid model is a facial AAM. More preferably again, the non-rigid model is a person specific facial AAM.

Preferably, the generic model is a facial AAM.

Preferably, the key images comprise images of a video sequence.

Preferably, generating the non-rigid model comprises decomposing a cost function into a plurality of sub-problems using the Alternating Directions Method of Multipliers (ADMM).

Preferably, the method further comprises:
applying a generic alignment algorithm to the key images, wherein generating the non-rigid model comprises initialising a search function using an output of the generic alignment algorithm.

Preferably, the generic alignment algorithm comprises the Constrained Local Model.

Preferably, the key images comprise a subset of a plurality of images.

Preferably, the non-rigid model is applied to the plurality of images.

Preferably, the method further comprises:
applying a generic alignment algorithm to the plurality of images; and clustering the plurality of images according to an output of the generic alignment algorithm;
wherein the key images comprise an image from each cluster.

According to a second aspect, the invention resides in a method of generating a plurality of avatar images, the method including:
receiving, on a data interface, a plurality of input images;
selecting, by a processor, a plurality of key images from the plurality of input images;
generating, by the processor, a non-rigid model by jointly minimising according to a cost function:
an appearance error between appearances in the plurality of key images and an appearance component of the non-rigid model;
a shape error between shapes in the plurality of key images and a shape component of the non-rigid model; and
a dimensionality of the shape and appearance components of the non-rigid model;
generating, by the processor, a plurality of parameters for the non-rigid model by fitting the non-rigid model to the plurality of input images; and
generating, by the processor, the plurality of avatar images, wherein an avatar depicted in the plurality of avatar images is animated using the plurality of parameters.

According to a third aspect, the invention resides in a system for generating a non-rigid model, the system including:
a data interface;
a processor coupled to the data interface; and
a memory coupled to the processor, the memory including computer readable instruction code for:
receiving, on the data interface, a plurality of key images; and
jointly minimising, on a processor and according to a cost function:
an appearance error between appearances in the plurality of key images and an appearance component of the non-rigid model;
a shape error between shapes in the plurality of key images and a shape component of the non-rigid model; and
a dimensionality of the shape and appearance components of the non-rigid model.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which:

FIG. 3b illustrates a side view of the shape data of FIG. 3a;

Those skilled in the art will appreciate that minor deviations from the layout of components as illustrated in the drawings will not detract from the proper functioning of the disclosed embodiments of the present invention.

BEST MODES OF THE INVENTION

Embodiments of the present invention comprise systems and methods of generating non-rigid models. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, the invention resides in a method of generating a non-rigid model including: receiving, on a data interface, a plurality of key images; and generating, by a processor, the non-rigid model based upon: an appearance error between appearances in the plurality of key images and an appearance component of the non-rigid model; a shape error between shapes in the plurality of key images and a shape component of the non-rigid model; and a dimensionality of the shape and appearance components of the non-rigid model.

Advantages of certain embodiments of the present invention include an ability to provide, at low complexity, a robust person specific model. Accordingly, a more efficient avatar animation can be provided. Further, by utilising both shape and appearance when generating the model, a more accurate model can be provided.

Figure 1:
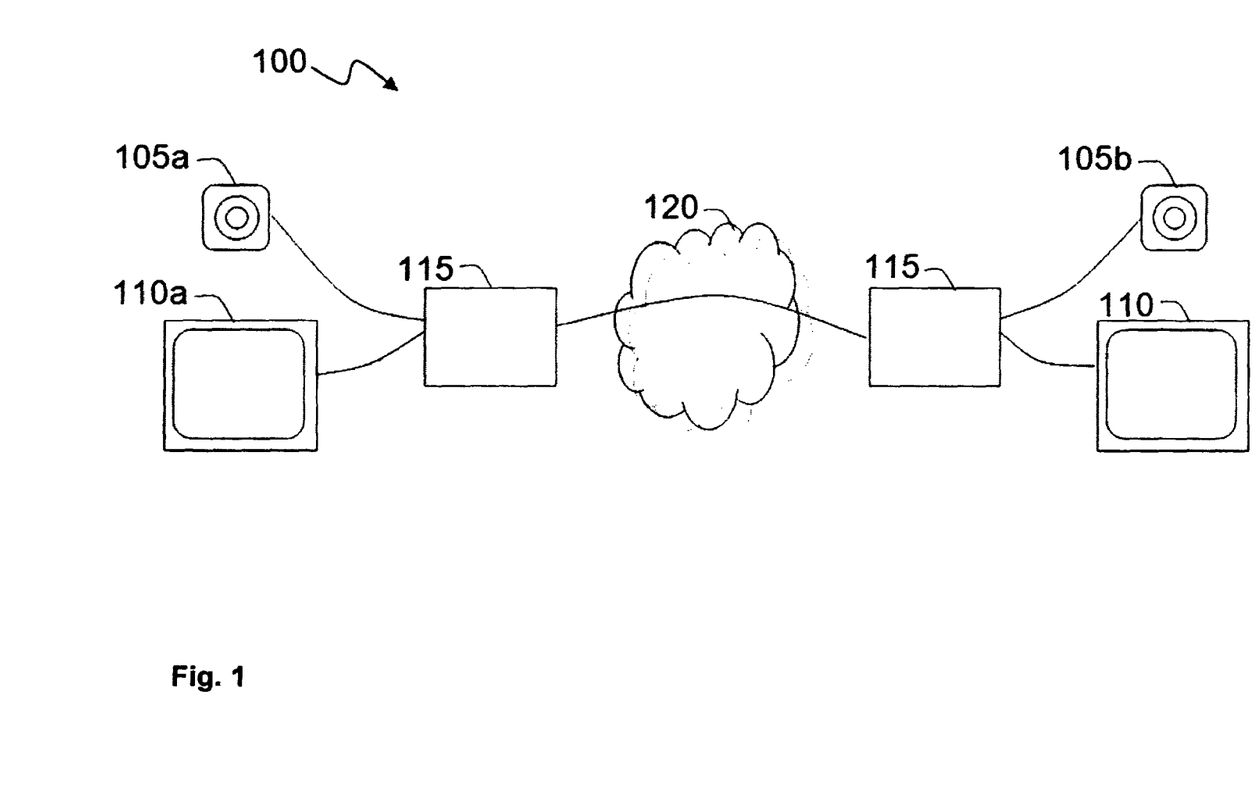
FIG. 1 illustrates a video conferencing system according to an embodiment of the present invention.

FIG. 1 illustrates a video conferencing system 100 according to an embodiment of the present invention.

The video conferencing system 100 includes a first camera 105a and a first display screen 110a coupled to a first computing device 115a, which together form a first part of the video conferencing system 100 at a first location. The video conferencing system 100 further includes a second camera 105b and a second display screen 110b coupled to a second computing device 115b, which together form a second part of the video conferencing system 100 at a second location.

The first and second computing devices 115a, 115b are coupled via a data communications network 120, such as the Internet.

Described below is a method for generating a video using a person specific model, where the video is displayed over the video conferencing system 100.

Prior to transmitting any video data, an enrolment phase is performed for the users of the system 100. The enrolment phase can be part of an account registration step, or can be performed the first time a user makes a video conference call using the system 100.

During the enrolment phase, an enrolment video of the user is recorded. The enrolment video can, for example, be 10 seconds long, however longer and shorter enrolment videos may be used to create more and less accurate person specific models or models with richer sets of expressions. It is, however, advantageous to keep the enrolment phase as short as possible so as to not inconvenience the user.

As will be readily understood by a skilled addressee, not all users of the video conference system 100 need to perform the enrolment phase. Some users may use a person specific active appearance model according to the present invention whereas others can use a generic model, for example. Similarly, a first user can animate an avatar, whereas a second user can transmit unmodified video.

A generic face detector is then applied to the enrolment video in order to localise the face of the user. An example of a generic face detector is a Viola-Jones based face detection algorithm. The background and other features of the video are then not considered further during the enrolment phase.

The system 100 can modify the enrolment video to include only the face, generate a new enrolment video sequence including only the face, or otherwise ignore the background and other features.

A person specific Active Appearance Model (AAM) is then generated based upon the faces of the enrolment video. An AAM is a model which represents both a shape and an appearance of an object. By representing both shape and appearance, the model uses all information in an image region covered by the target object, rather than just edges.

In this case, shape refers to the geometry of the face, such as the shape and location of eyes, mouth and other features of the face. Appearance refers to the texture or look of the face, which is provided in the pixel values of the image.

When fitting an AAM to, the faces of the enrolment video, there is an error between a shape of the faces in the video and the shape of the faces as modelled by the AAM, and an error between an appearance of the faces in the video and the appearance of the faces as modelled by the AAM. The magnitude of the error is typically reduced as the model becomes more complex and is thus able to more efficiently render shapes and texture.

The present invention provides an AAM that is both simple, i.e. low dimensional, and accurate, i.e. providing low shape and appearance error. This is done by jointly minimising:

1) an appearance error between appearances in the plurality of key images and an appearance component of the non-rigid model;
2) a shape error between shapes in the plurality of key images and a shape component of the non-rigid model; and
3) a dimensionality of the shape and appearance components of the non-rigid model.

The AAM is also anchored to the generic subspace of all faces, to avoid over-fitting of data. By incorporating prior generic knowledge of the generic face appearance and shape subspace, a more stable model can be generated.

The generation of the AAM can be performed by:

$$\min_{D_*,\{\Delta p_i\}_{i=1}^T} \|D\|_* + \lambda_a \|E_a\|_1 + \lambda_s \|E_s\|_1$$

s.t. $I + [J_1 \Delta p_i \ldots, J_T \Delta p_T] = D + [E_a; E_s]$ $$D = \Phi C.$$

Here, D=[A; S], where D denotes a concatenation of the estimated warped appearance and shape in each image of the collection, stacked as the columns of the matrices A and S respectively. $E_a$ and $E_s$ denote the appearance error and the shape error, and $\lambda_a$ and $\lambda_s$ denote weighting factors of the appearance error and shape error respectively. I denotes the warped images and shapes at which linearisation of the image and warping functions were performed. $J_t$ denotes stacked Jacobians for the image and warping functions of the t'th image respectively. Finally, $\Phi$ denotes a generic linear model of the combined appearance and shape variations, with C denoting the coefficients for each image stacked as columns.

The person specific AAM can then be obtained from D using Singular Value Decomposition, as will be readily understood by a person skilled in the art.

The generation of the AAM, as discussed above, can be decomposed into a number of sub-problems using Alternating Directions Method of Multipliers (ADMM). Each of the sub-problems can be solved simply and efficiently on a computer processor. Using Lagrange multipliers, the generation of the AAM can be rewritten as:

$$\mathcal{L}: \|D\|_* + \lambda_a \|E_a\|_1 + \lambda_s \|E_s\|_1 +$$

$$\frac{\mu}{2}\left\|I + J(\Delta P) - D - E + \frac{1}{\mu}Y\right\|^2 + \frac{\nu}{2}\left\|D - \Phi C + \frac{1}{\nu}Q\right\|^2$$

where $E = [E_a; E_s]$.

As will be understood by a person skilled in the art, the inflection point of the Lagrangian multiplier, which is equivalent to the solution used to generate the AAM, can be found by alternating the following steps until convergence:

$$D = US_{\frac{1}{a+1}}(W)V^T, \text{ where} \quad 1$$

$$UWV^T = \mu\left(I + J(\Delta P) - E + \frac{1}{\mu}Y\right) - \nu\left(\Phi C - \frac{1}{\nu}Q\right)$$

$$E_a = S_{\frac{\lambda_a}{a}}(F_a), \text{ where } F = [F_a; F_s] = I + J(\Delta P) - D - E + \frac{1}{\mu}Y. \quad 2$$

$$E_s = S_{\frac{\lambda_s}{\mu}}(F_s) \quad 3$$

$$\Delta p_t = (J_t^T J_t)^{-1} J_t^T \left(d_t + e_t - i_t - \frac{1}{\mu}y_t\right). \quad 4$$

$$C = \Phi^T\left(D + \frac{1}{\nu}Q\right) \quad 5$$

$$Y - Y + \frac{1}{\mu}(I + J(\Delta P) - D - E) \quad 6$$

$$Q - Q + \frac{1}{\nu}(D - \Phi C) \quad 7$$

Once the person specific AAM has been generated it can be used in the video conferencing system 100.

The person specific AAM can be made available to other users of the video conferencing system 100, which enables them to reconstruct shape and/or appearance data using parameters of the person specific AAM. According to certain embodiments, both shape and appearance is used to generate the model, wherein only shape is used to animate an avatar. By considering both shape and appearance when generating the model, a more accurate model can be generated.

Input images of the user are captured using the camera 105a and the person specific AAM is fitted to the images. The fitting of the person specific AAM is advantageously performed as the images are received by the camera 105a in order to avoid introducing a delay in the video conferencing.

The first computing device 115a then transmits shape parameters of the person specific AAM to the second computing device 115b, which then applies the shape parameters to an avatar using, for example, user-avatar mappings. The user-avatar mappings can be transmitted to the second user device 115b, or generated by the second user device 410b, 510b. The avatar is then rendered on the screen of the second user device 410b.

According to alternative embodiments (not shown), the video conferencing system 100 can include a gateway server through which data is transmitted. The gateway server can receive unprocessed video from the first computing device 115a and generate the person specific AAM, or receive the person specific AAM from the first computing device 115a and render an avatar based thereon. Then either the person specific AAM or the rendered avatar is sent to the second user device 115b. This enables part of the processing to be performed away from the first computing device 115a and/or second computing device 115b.

The term unprocessed here refers to the video not having been processed to generate the person specific AAM. As will be readily understood by the skilled addressee, the video may be compressed, encrypted, or otherwise modified after being captured by the camera.

According to certain embodiments, the ADMM functions for generating the person specific AAM are initialised using a generic face alignment algorithm. An example of a generic face alignment algorithm is the Constrained Local Model (CLM). This is useful in locating a global minimum in the joint optimisation, i.e. finding an accurate person specific AAM, rather than finding a local minimum that does not correspond to an accurate person specific AAM.

According to certain embodiments, computational load of generating the person specific AAM is further reduced by selecting a plurality of key frames from the enrolment video. As fewer images are used in generation of the person specific active appearance model, significant complexity reductions can be achieved.

In this case, a generic face alignment algorithm, such as the CLM mentioned above, is used to obtain an estimate of the shapes of the faces in the enrolment video. The faces, i.e. frames of the enrolment video, are then clustered according to the output of the generic face alignment algorithm, i.e. the estimates of the shapes. Frames of the enrolment video that exhibit the most distinct facial shapes are then chosen as key frames.

The joint minimisation of shape error, appearance error and dimensionality of the person specific AAM is then performed only using the key frames.

Figure 2:
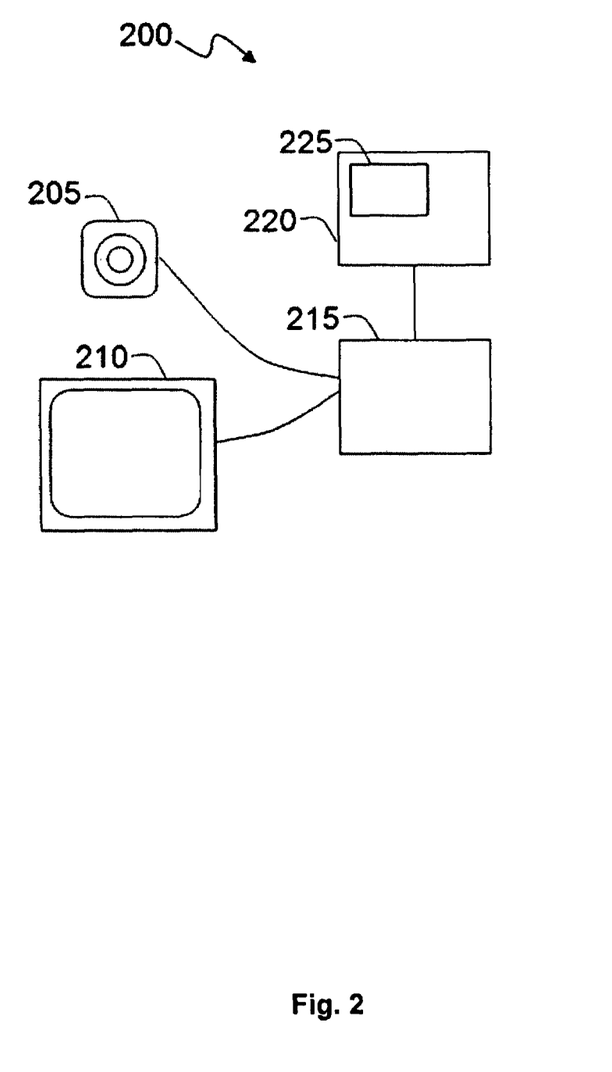
FIG. 2 illustrates a system for generating a person specific active appearance model, according to an embodiment of the present invention.

FIG. 2 illustrates a system 200 for generating a person specific active appearance model, according to an embodiment of the present invention.

The system 200 includes a camera 205 and a display screen 210, similar to first and second computing devices 115a, 115b of FIG. 1. The system 200 can be used for example for animating an avatar in a video clip, which can then be saved, uploaded to a file-sharing site, or sent to a friend.

The system 200 further includes a processor 215 that is coupled to the camera 205 and the display screen 210. The processor 215 is further coupled to a memory 220 including instruction code 225 for generating a person specific AAM based upon video recorded by the camera 205.

The instruction code 225 includes instructions for receiving video from the camera 205, generating a person specific AAM based upon at least part of the video, fitting the person specific AAM to the video, and generating an avatar image based upon shape parameters of the person specific AAM when applied to the video.

As will be understood by a person skilled in the art, the plurality of key images need not be captured by the camera 205. The system 200 can, for example, comprise a network interface (not shown) for connecting the system 200 to a network through which the video can be received. Alternatively, the video can be read from a file. Accordingly, a person specific AAM can be created from a video clip of a first user, and used to animate an avatar.

The system 200 can, for example, comprise a low processing power device, such as a mobile telephone, Personal Digital Assistant (PDA), tablet computer, or other similar device, a personal computer, or a plurality of computing devices.

According to an alternative embodiment (not shown), the system 200 sends the video to a server that processes the video and generates the person specific active appearance model. The person specific active appearance model is then sent back from the server to the system 200. The system 200 can then fit the person specific model to the video (or other video), and then animate an avatar model according to shape parameters. Alternatively, the server can also fit the person specific AAM to the video.

Animation of the avatar model is particularly suited to Graphics Processing Units (GPUs) of compact devices, such as mobile phones. Animation can include transferring a facial expression of a user to that of a face of an avatar, or transferring a body configuration or movement. This can include, for example, animating an avatar to include the expressions of a user, causing an avatar to dance or move in a specific way, or to produce specific movements such as sign language.

Animation of the avatar can comprise applying a 3D model, the AAM parameters, or other shape data to the avatar data, and may include applying a mapping function to the shape data according to the avatar data. Furthermore, animation of the avatar can be performed according to a plurality of source-avatar mapping functions, as described for example in International Patent Application No. PCT/AU2012/000295, titled "METHOD AND SYSTEM FOR FACIAL EXPRESSION TRANSFER", filed by the applicant of the present invention on 21 Mar. 2012.

Figure 3A:
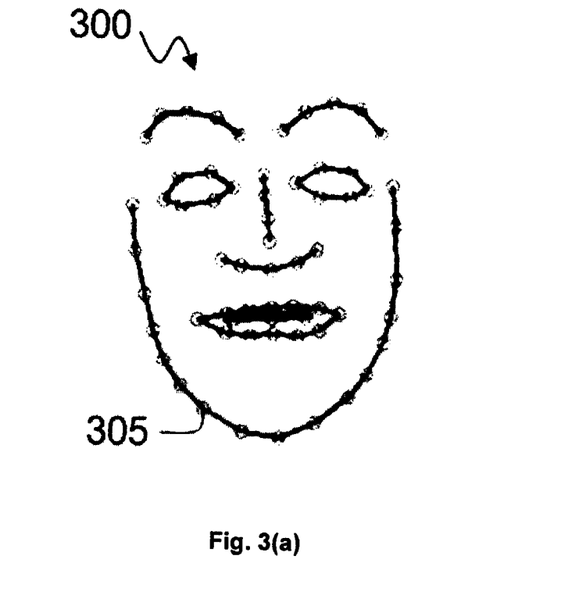
FIG. 3a illustrates a front view of shape data, according to an embodiment of the present invention.
Figure 3B:
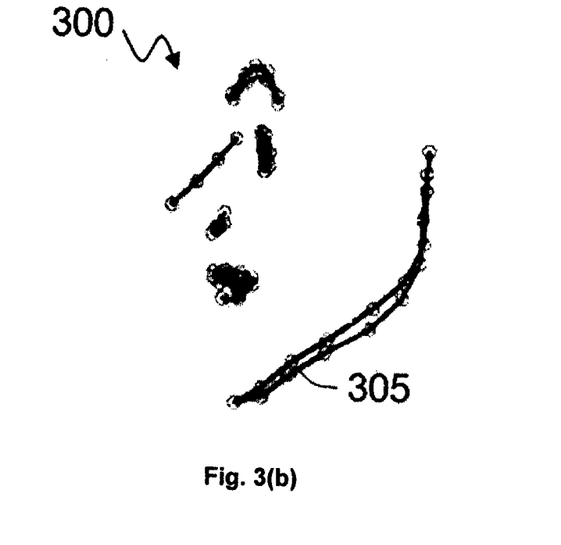

FIG. 3a illustrates a front view of shape data 300, according to an embodiment of the present invention, and FIG. 3b illustrates a side view of the shape data 300.

The shape data 300 comprises a plurality of 3D points 305, corresponding to features of a user's face. The features can include an eye, a mouth, eyebrows, jaw shape, or any other features. As defined herein, the shape data 300 can be input into a person specific AAM to refine the AAM.

Figure 4:
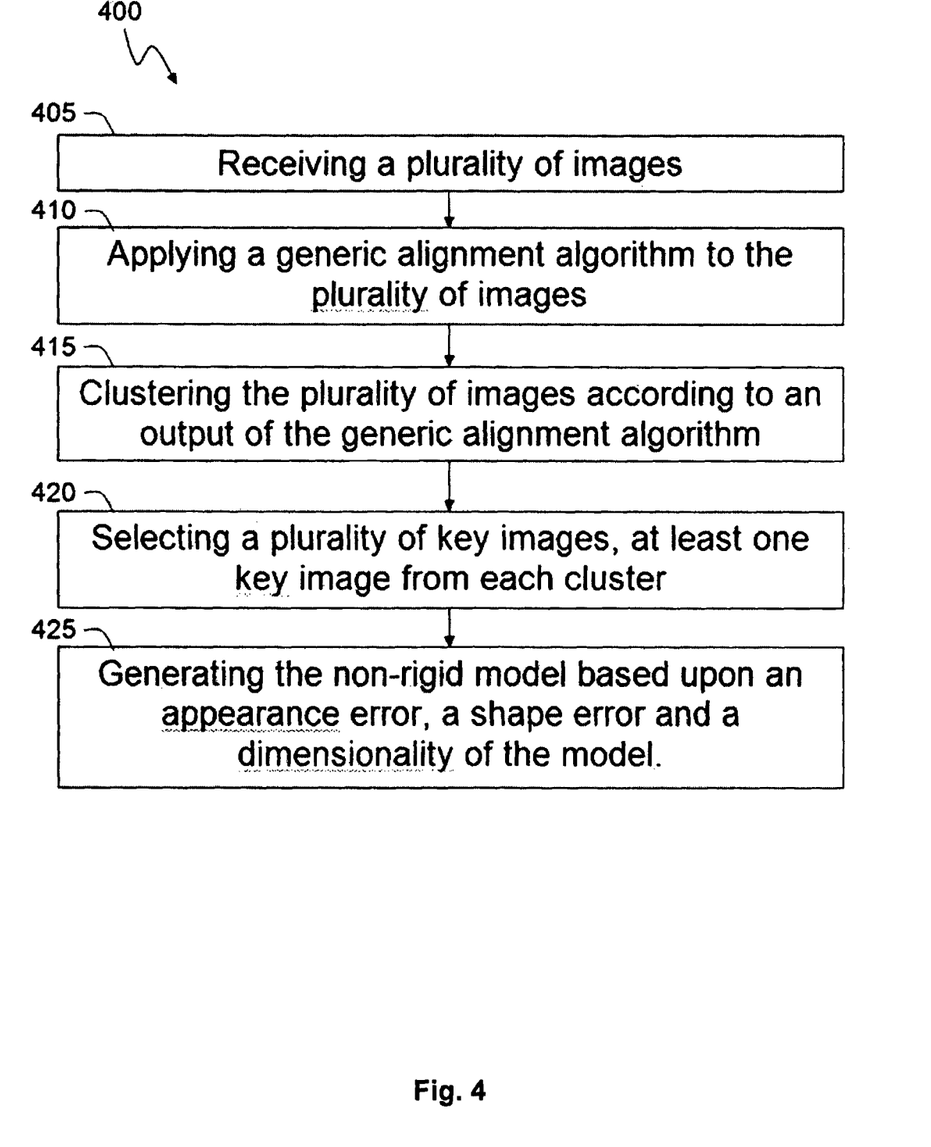
FIG. 4 illustrates a method of generating a person specific AAM, according to an embodiment of the present invention.

FIG. 4 illustrates a method 400 of generating a person specific AAM, according to an embodiment of the present invention.

In step 405, a plurality of images is received, relating to a user. The plurality of images advantageously comprise a video sequence to which the person specific AAM is to be applied, as discussed above.

In step 410, a generic alignment algorithm is applied to the plurality of images. The generic alignment algorithm can, for example, comprise the CLM.

In step 415, the plurality of images is clustered according to an output of the generic alignment algorithm. The clustering is advantageously based upon facial shapes in the plurality of images such that similar facial shapes are clustered together.

In step 420, a plurality of key images is selected, including at least one key image from each cluster. This provides a set of key images that represent a broad range of facial shapes of the user and including, for example, the shape data 300.

In step 425, the non-rigid model is generated based upon an appearance error, a shape error and a dimensionality of the model, as discussed above.

Figure 5:
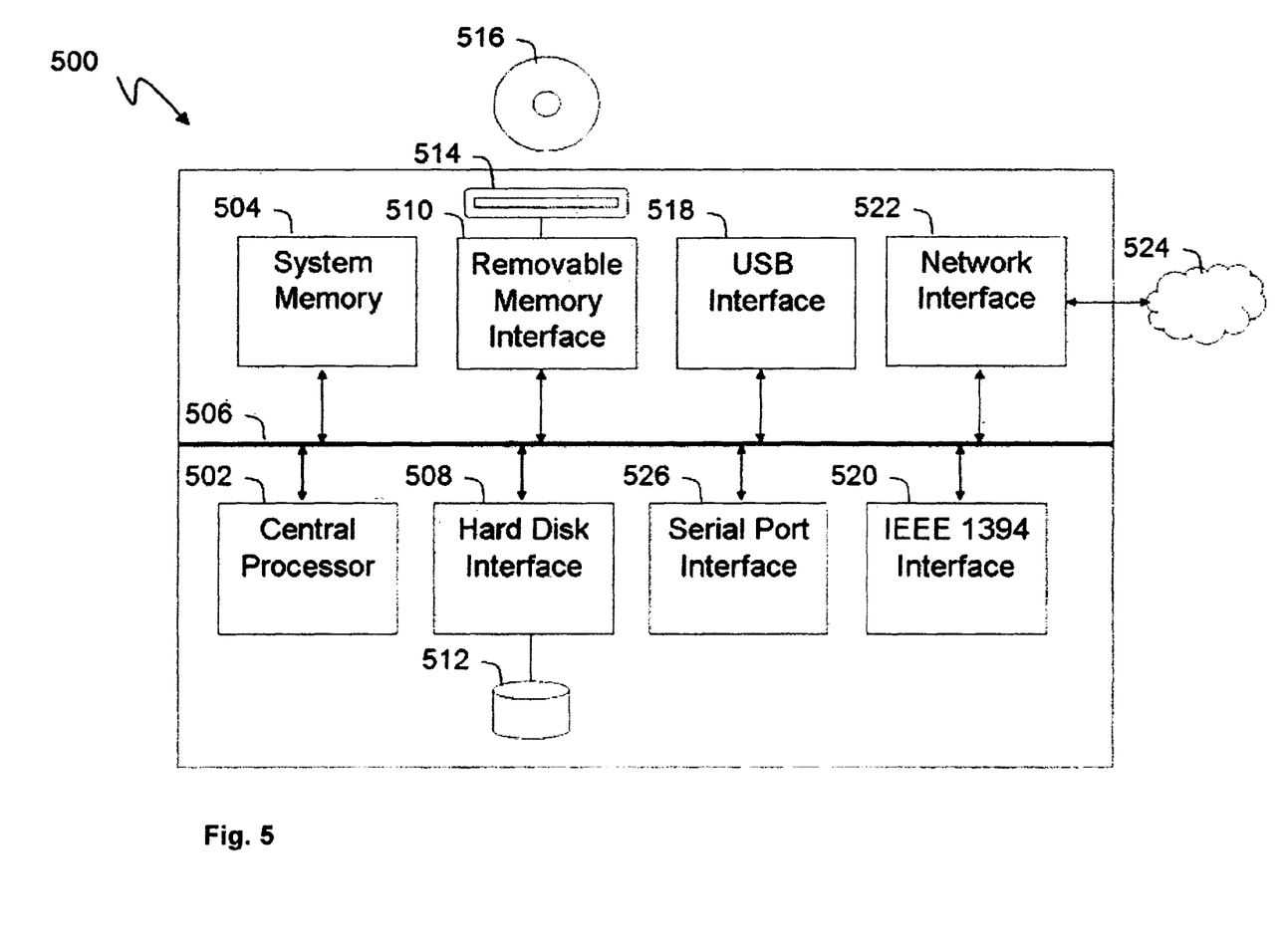
FIG. 5 diagrammatically illustrates a computing device, according to an embodiment of the present invention.

FIG. 5 diagrammatically illustrates a computing device 500, according to an embodiment of the present invention. The first and second computing devices 105a, 105b of FIG. 1 can be similar or identical to the computing device 500. Similarly, the method 400 of FIG. 4 can be implemented using the computing device 500.

The computing device 500 includes a central processor 502, a system memory 504 and a system bus 506 that couples various system components, including coupling the system memory 504 to the central processor 502. The system bus 506 may be any of several types of bus structures including a memory bus or memory controller, a peripheral bus, and a local bus using any of a variety of bus architectures. The structure of system memory 504 is well known to those skilled in the art and may include a basic input/output system (BIOS) stored in a read only memory (ROM) and one or more program modules such as operating systems, application programs and program data stored in random access memory (RAM).

The computing device 500 can also include a variety of interface units and drives for reading and writing data. The data can include, for example, a displacement between the camera and the display screen as discussed above.

In particular, the computing device 500 includes a data storage interface 508 and a removable memory interface 510, respectively coupling a solid state or hard disk drive 512 and a removable memory drive 514 to the system bus 506. Examples of removable memory drives 514 include magnetic disk drives and optical disk drives. The drives and their associated computer-readable media, such as a Digital Versatile Disc (DVD) 516 provide non-volatile storage of computer readable instructions, data structures, program modules and other data for the computer system 500. A single hard disk drive 512 and a single removable memory drive 514 are shown for illustration purposes only and with the understanding that the computing device 500 can include several similar drives. Furthermore, the computing device 500 can include drives for interfacing with other types of computer readable media.

The computing device 500 may include additional interfaces for connecting devices to the system bus 506. FIG. 5 shows a universal serial bus (USB) interface 518 which may be used to couple a device to the system bus 506. For example, an IEEE 1394 interface 520 may be used to couple additional devices to the computing device 500. Examples of additional devices include cameras for receiving images or video, or microphones for recording audio.

The computing device 500 can operate in a networked environment using logical connections to one or more remote computers or other devices, such as a server, a router, a network personal computer, a peer device or other common network node, a wireless telephone or wireless personal digital assistant. The computing device 500 includes a network interface 522 that couples the system bus 506 to a local area network (LAN) 524. Networking environments are commonplace in offices, enterprise-wide computer networks and home computer systems.

A wide area network (WAN), such as the Internet, can also be accessed by the computing device, for example via a modem unit connected to a serial port interface 526 or via the LAN 524.

Transmission of shape parameters and/or video can be performed using the LAN 524, the WAN, or a combination thereof.

It will be appreciated that the network connections shown and described are exemplary and other ways of establishing a communications link between computers can be used. The existence of any of various well-known protocols, such as TCP/IP, Frame Relay, Ethernet, FTP, HTTP and the like, is presumed, and the computing device 500 can be operated in a client-server configuration to permit a user to retrieve data from, for example, a web-based server.

The operation of the computing device 500 can be controlled by a variety of different program modules. Examples of program modules are routines, programs, objects, components, and data structures that perform particular tasks, or implement particular abstract data types. The present invention may also be practiced with other computer system configurations, including hand-held devices, multiprocessor systems, microprocessor-based or programmable consumer electronics, network PCs, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

In summary, advantages of certain embodiments of the present invention include an ability to provide, at low complexity, a robust person specific model. Accordingly, more efficient avatar animations can be provided.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A method of generating a non-rigid model including:
   receiving, on a data interface of a computing device, a plurality of key images; and
   generating, by a processor of the computing device, the non-rigid model by jointly minimising according to a cost function, wherein the cost function comprises:

$\|D\|_* + \lambda_a \|E_a\|_1 + \lambda_s \|E_s\|_1$, wherein $\|E_a\|_1$ comprises an L1 norm of an appearance error between appearances in the plurality of key images and an appearance component of the non-rigid model;

$\|E_s\|_1$ comprises an L1 norm of a shape error between shapes in the plurality of key images and a shape component of the non-rigid model;

$\lambda_a$, $\lambda_s$ comprise weighting factors of the appearance error and the shape error respectively; and $\|D\|_*$ comprises a dimensionality being a rank or a norm of a matrix describing the appearance and shape components-of the non-rigid model, wherein D comprises [A; S] which denotes a concatenation of an estimated warped appearance and shape in each image of the key images forming matrices A and S, respectively.

2. A method according to claim 1, wherein the dimensionality of the matrix describing the shape and appearance components of the non-rigid model comprises a rank of the matrix describing the shape and appearance components.

3. A method according to claim 1, wherein the dimensionality of the matrix describing the shape and appearance components of the non-rigid model comprises determining a nuclear norm of the matrix describing the shape and appearance components.

4. A method according to claim 1, wherein generating the non-rigid model further comprises anchoring the non-rigid model to a subspace of a generic model.

5. A method according to claim 1, wherein the non-rigid model comprises an Active Appearance Model (AAM).

6. A method according to claim 5, wherein the non-rigid model comprises a person-specific facial AAM.

7. A method according to claim 1, wherein the key images comprise images of a video sequence.

8. A method according to claim 1, wherein the generating the non-rigid model comprises decomposing a cost function into a plurality of sub-problems using the Alternating Directions Method of Multipliers (ADMM).

9. A method according to claim 1, further comprising:
applying a generic alignment algorithm to the key images, wherein generating the non-rigid model comprises initialising a search function using an output of the generic alignment algorithm.

10. A method according to claim 9, wherein the generic alignment algorithm comprises the Constrained Local Model.

11. A method according to claim 1, wherein the key images comprise a subset of a plurality of images.

12. A method according to claim 11, wherein the non-rigid model is applied to the plurality of images.

13. A method according to claim 1, further comprising:
applying a generic alignment algorithm to a plurality of images; and clustering the plurality of images according to an output of the generic alignment algorithm;
wherein the key images comprise an image from each cluster.

14. A method of generating a plurality of avatar images, the method including:
receiving, on a data interface of a computing device, a plurality of input images;
selecting, by a processor of the computing device, a plurality of key images from the plurality of input images;

generating, by the processor, a non-rigid model by jointly minimising according to a cost function, wherein the cost function comprises:

$\|D\|_*+\lambda_a\|E_a\|_1+\lambda_s\|E_s\|_1$, wherein $\|E_a\|_1$ comprises an L1 norm of an appearance error between appearances in the plurality of key images and an appearance component of the non-rigid model;

$\|E_a\|_1$ comprises an L1 norm of a shape error between shapes in the plurality of key images and a shape component of the non-rigid model;

$\lambda_a$, $\lambda_s$ comprise weighting factors of the appearance error and the shape error respectively; and $\|D\|_*$ comprises a dimensionality being a rank or a norm of a matrix describing the appearance and shape components-of the non-rigid model, wherein D comprises [A; S] which denotes a concatenation of an estimated warped appearance and shape in each image of the key images forming matrices A and S, respectively;

generating, by the processor, a plurality of parameters for the non-rigid model by fitting the non-rigid model to the plurality of input images; and generating, by the processor, the plurality of avatar images, wherein an avatar depicted in the plurality of avatar images is animated using the plurality of parameters.

15. The method of claim 14, wherein the animated avatar is displayed in a video conference system.

16. A system for generating a non-rigid model, the system including:
a data interface;
a processor coupled to the data interface; and
a memory coupled to the processor, the memory including computer readable instruction code for:
receiving, on the data interface, a plurality of key images; and
jointly minimising, on a processor and according to a cost function, wherein the cost function comprises:

$\|D\|_*+\lambda_a\|E_a\|_1+\lambda_s\|E_s\|_1$, wherein $\|E_a\|_1$ comprises an L1 norm of an appearance error between appearances in the plurality of key images and an appearance component of the non-rigid model;

$\|E_s\|_1$ comprises an L1 norm of a shape error between shapes in the plurality of key images and a shape component of the non-rigid model;

$\lambda_a$, $\lambda_s$ comprise weighting factors of the appearance error and the shape error respectively; and $\|D\|_*$ comprises a dimensionality being a rank or a norm of a matrix describing the appearance and shape components-of the non-rigid model, wherein D comprises [A; S] which denotes a concatenation of an estimated warped appearance and shape in each image of the key images forming matrices A and S, respectively.

* * * * *